US012681409B2

(12) United States Patent
Akedo

(10) Patent No.: US 12,681,409 B2
(45) Date of Patent: Jul. 14, 2026

(54) DEVELOPMENT DEVICE AND IMAGE FORMING DEVICE THAT PREVENTS TONER LEAKAGE

(71) Applicant: SHARP KABUSHIKI KAISHA, Sakai City (JP)

(72) Inventor: Shuichi Akedo, Sakai City (JP)

(73) Assignee: SHARP KABUSHIKI KAISHA, Sakai City (JP)

( * ) Notice: Subject to any disclaimer, the term of this patent is extended or adjusted under 35 U.S.C. 154(b) by 0 days.

(21) Appl. No.: 18/941,319

(22) Filed: Nov. 8, 2024

(65) Prior Publication Data

US 2025/0216806 A1 Jul. 3, 2025

(30) Foreign Application Priority Data

Dec. 28, 2023 (JP) ................................ 2023-222232

(51) Int. Cl.
*G03G 15/08* (2006.01)
*G03G 21/02* (2006.01)
*G03G 21/20* (2006.01)

(52) U.S. Cl.
CPC ..... *G03G 15/0898* (2013.01); *G03G 15/0891* (2013.01); *G03G 21/02* (2013.01); *G03G 21/206* (2013.01); *G03G 15/0889* (2013.01); *G03G 2215/0822* (2013.01); *G03G 2215/0838* (2013.01); *G03G 2221/1645* (2013.01)

(58) Field of Classification Search
CPC ........... G03G 15/0898; G03G 15/0891; G03G 21/02; G03G 21/206; G03G 15/0889; G03G 15/0882; G03G 15/0893; G03G 2215/0822; G03G 2215/0838; G03G 2215/088; G03G 2221/1645; G03G 15/0881; G03G 15/09; G03G 2215/0609; G03G 2215/0819; G03G 2215/0827; G03G 15/0884; G03G 2215/0687; G03G 2215/069; G03G 2215/0841
See application file for complete search history.

(56) References Cited

U.S. PATENT DOCUMENTS

| | | | | |
|---|---|---|---|---|
| 2013/0108310 A1* | 5/2013 | Hirakawa | G03G 15/0898 399/92 |
| 2019/0302691 A1* | 10/2019 | Kawahito | G03G 15/0875 |
| 2019/0369537 A1* | 12/2019 | Yamaguchi | G03G 15/5058 |

(Continued)

FOREIGN PATENT DOCUMENTS

| | | |
|---|---|---|
| JP | 2007178905 A * | 7/2007 |
| JP | 2022-099391 A | 7/2022 |

*Primary Examiner* — Stephanie E Bloss
*Assistant Examiner* — Laura Roth
(74) *Attorney, Agent, or Firm* — ScienBiziP, P.C.

(57) ABSTRACT

A development device includes a development tank that stores a developer, a first screw and a second screw that convey the developer, an exhaust port through which air inside the development tank is exhausted, and a filter provided at the exhaust port.
The development tank includes a first holder provided with a first screw, a second holder provided with a second screw, a partition wall that partitions the first holder and the second holder, and a first flow port and a second flow port that open the partition wall and through which the developer flows between the first holder and the second holder. A shield partitions the first holder and the exhaust port, and the second holder is connected to the exhaust port.

8 Claims, 7 Drawing Sheets

(56) References Cited

U.S. PATENT DOCUMENTS

| | | | | |
|---|---|---|---|---|
| 2022/0035271 | A1* | 2/2022 | Wakisaka | G03G 15/09 |
| 2022/0121138 | A1* | 4/2022 | Yamada | G03G 15/0891 |
| 2022/0197186 | A1 | 6/2022 | Harada | |
| 2022/0308498 | A1* | 9/2022 | Hoshino | G03G 15/0896 |
| 2023/0305438 | A1* | 9/2023 | Okuno | G03G 15/0882 |

* cited by examiner

DEVELOPMENT DEVICE AND IMAGE FORMING DEVICE THAT PREVENTS TONER LEAKAGE

TECHNICAL FIELD

The present disclosure relates to a development device including a development tank and an image forming device.

BACKGROUND ART

In the related art, an electrophotographic image forming device is known. In such an image forming device, a development device including a development container (development tank) containing a developer is adopted. The development device is provided with a development roller and a stirring member. Rotating the development roller and the stirring member causes air to be suctioned into the development container from the outside, and then an internal air pressure to be increased, and the developer may be caused to scatter outside. Thus, a technique of providing a duct through which the air flows out and suppressing the scatter of the developer is known.

SUMMARY

Technical Problem

In the related art, a development device includes a first stirring chamber and a second stirring chamber divided by a partition and disposed in parallel with each other, and a communication unit that causes the first stirring chamber and the second stirring chamber to communicate with each other at a side of both end portions in a longitudinal direction, a development container that stores a developer including a toner that is supplied to an image carrier, a first stirring member and a second stirring member that are rotatably supported inside the first stirring chamber and the second stirring chamber, respectively, that stir and convey the developer in directions opposite to each other along an axial direction of rotation and that circulate the developer in a predetermined circulation direction, and a developer carrier (development roller) that is rotatably supported in the development container and faces an image carrier and that supplies a toner stored in the second stirring chamber to an image carrier. Then, the development container includes a duct that is disposed adjacent to the second stirring chamber and that causes air in the second stirring chamber to flow out to the outside, a suction port that opens along a longitudinal direction of the second stirring chamber and that causes the second stirring chamber and the duct to communicate with each other, a first filter that covers the suction port, and a second filter that is disposed downstream relative to the first filter in an air flow direction in the duct and that covers the air flow path.

However, in the development device in the related art, since the air in the second stirring chamber flows into the duct through the vicinity of the developer carrier, the toner may be spouted out from a gap between the developer carrier and the development container.

The present disclosure has been made to solve the above-described problems, and an object of the present disclosure is to provide a development device and an image forming device capable of suppressing the spouting of the toner.

Solution to Problem

According to an embodiment of the present disclosure, there is provided a development device including a development tank that stores a developer, the developer including a toner, a developer carrier that carries the developer, a first conveyance member and a second conveyance member that have rotary shafts being in parallel with each other and face each other, that stir and convey the developer in the development tank, and that supply the developer to the developer carrier, an exhaust port through which air inside the development tank is exhausted, and a filter that is provided at the exhaust port and that collects the developer included in the exhausted air, wherein the development tank is provided with a first holder provided with the first conveyance member and disposed at a close side to the developer carrier, a second holder provided with the second conveyance member and disposed at a far side from the developer carrier, a partition wall that partitions the first holder and the second holder, and a flow port that is provided at an end portion in an axial direction along the rotary shaft, that opens the partition wall, and through which the developer flows between the first holder and the second holder, wherein a shield partitions the first holder and the exhaust port, and the second holder is connected to the exhaust port.

In the development device according to the present disclosure, a flow port, of the first conveyance member, facing a downstream end portion may have an opening area larger than an opening area of the other flow port in a conveyance direction of the developer in the development tank.

In the development device according to the present disclosure, the developer carrier may be provided above the first conveyance member, and the partition wall may be provided with a ventilation port that opens a portion facing the developer carrier in a horizontal direction.

In the development device according to the present disclosure, the developer carrier may be provided above the first conveyance member, and the shield may be provided above the developer carrier.

In the development device according to the present disclosure, the exhaust port may be provided at an upper portion of the development tank and extend in the axial direction.

In the development device according to the present disclosure, the exhaust port may be provided so as to cross over the first holder and the second holder.

In the development device according to the present disclosure, the exhaust port may be connected to a duct through which air passes via the filter, and the duct may be provided with an intake fan that suctions air from the development tank.

In the development device according to the present disclosure, the intake fan may suction air from the development tank after image formation.

According to the present disclosure, the development device may further include a printing rate determinator that determines a printing rate on a sheet on which an image is formed, and a sheet number counter that counts the number of sheets on each of which an image is formed, wherein the intake fan may suction air from the development tank based on the printing rate and the number of sheets in image formation.

Advantageous Effects of Disclosure

According to the present disclosure, the air flowing from the first holder to the exhaust port is blocked by the shield and guided to flow through the exhaust port through the second holder, so that the air flow toward the developer carrier can be eliminated. Thereby, the spouting of the toner from the vicinity of the developer carrier can be suppressed.

DESCRIPTION OF EMBODIMENTS

First Embodiment

An image forming device according to a first embodiment of the present disclosure will be described below with reference to the accompanying drawings.

Figure 1:
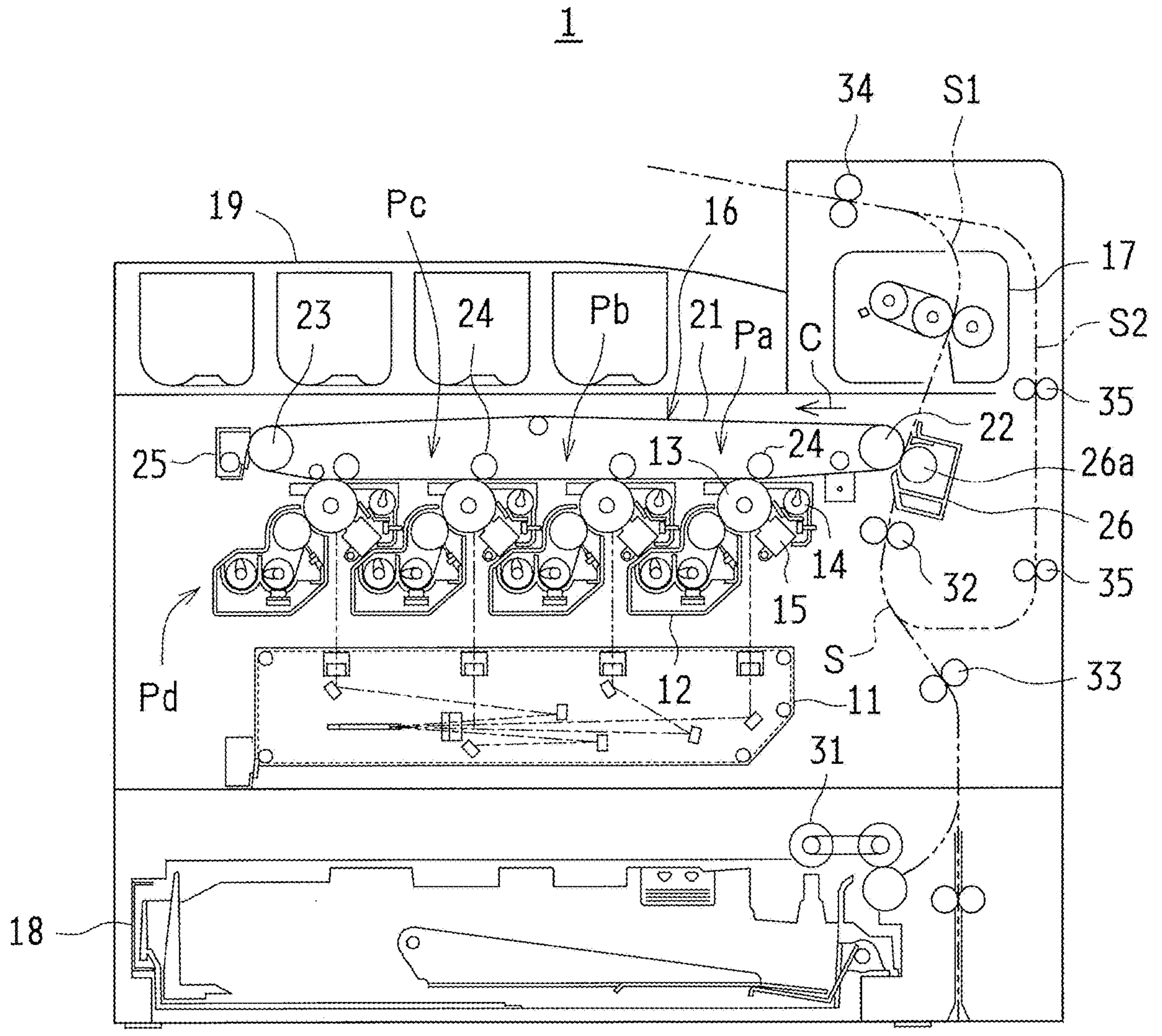
FIG. 1 is a schematic side view of an image forming device according to a first embodiment of the present disclosure.

FIG. 1 is a schematic side view of the image forming device according to the first embodiment of the present disclosure.

According to the first embodiment of the present disclosure, an image forming device 1 includes an exposure device 11, a development device 12, a photoreceptor drum 13 (as an example of the image carrier), a cleaner device 14, a charger 15, an intermediate transfer belt device 16, a fixing device 17, a feed tray 18, an output tray 19, and a sheet conveying path S, and forms a multicolor image and a monochrome image on a predetermined sheet in accordance with image data transmitted from the outside.

The image data used in the image forming device 1 corresponds to a color image made up of the colors black (K), cyan (C), magenta (M), and yellow (Y). Accordingly, four sets of the development device 12, the photoreceptor drum 13, the charger 15, and the cleaner device 14 are provided, and respectively set to black, cyan, magenta, and yellow to form four types of latent images corresponding to the respective colors. Thus, four image stations Pa, Pb, Pc, and Pd are constituted.

The photoreceptor drums 13 are each disposed substantially at the center of the image forming device 1. The charger 15 causes the surface of the photoreceptor drum 13 to be uniformly electrically charged at a predetermined electric potential. The exposure device 11 exposes the surfaces of the photoreceptor drums 13 to form electrostatic latent images. The development device 12 develops an electrostatic latent image on the surface of the photoreceptor drum 13 to form a toner image on the surface of the photoreceptor drum 13. With this series of operations described above, the toner images of respective colors are formed on the respective surfaces of the photoreceptor drums 13. The cleaner device 14 removes and collects the residual toner on the surface of the photoreceptor drum 13 after development and image transfer. Note that a structure of the development device 12 will be described with reference to FIG. 2 or FIG. 5, which will be described below.

The intermediate transfer belt device 16 is disposed above the photoreceptor drums 13, and includes an intermediate transfer belt 21, an intermediate transfer belt driving roller 22, an intermediate transfer belt driven roller 23, an intermediate transfer roller 24, and an intermediate transfer belt cleaning device 25. Note that four intermediate transfer rollers 24 are provided corresponding to the image stations of the respective colors for YMCK.

The intermediate transfer belt 21 is stretched over the intermediate transfer belt driving roller 22, the intermediate transfer belt driven roller 23, and the intermediate transfer rollers 24 in such a manner that the surface of the intermediate transfer belt 21 is moved in a predetermined direction (a direction of an arrow C in the drawing).

The intermediate transfer belt 21 is rotated and moved in the direction of the arrow C, the residual toner is removed and collected by the intermediate transfer belt cleaning device 25, and the toner images of respective colors formed on the respective surfaces of the photoreceptor drums 13 are sequentially transferred and superimposed to form a color toner image on the surface of the intermediate transfer belt 21.

The image forming device 1 further includes a secondary transfer device 26 including a transfer roller **26*a*. A nip region is formed between the transfer roller 26*a* and the intermediate transfer belt 21, and the transfer roller 26*a* conveys a sheet having been conveyed through the sheet conveying path S while nipping the sheet in the nip region. When the sheet passes through the nip region, the toner image on the surface of the intermediate transfer belt 21** is transferred to the sheet.

The feed tray 18 stores sheets to be used for image formation and is provided below the exposure device 11. The output tray 19 is provided at an upper side of the image forming device 1 and serves as a tray for setting the sheets on which images have been formed.

The sheet conveying path S includes a main path S1 formed in an S shape, and a reverse path S2, which branches in the middle of the main path S1 and rejoins with the main path S1. A pickup roller 31, a pre-registration roller 33, a registration roller 32, the secondary transfer device 26, the fixing device 17, and a sheet discharge roller 34 are disposed along the main path S1. The reverse path S2 branches from between the fixing device 17 and the sheet discharge roller 34, passes through a plurality of conveying rollers 35, and rejoins at a location between the pre-registration roller 33 and the registration roller 32.

The pickup roller 31 is provided in the vicinity of an end portion of the feed tray 18, and is a so-called pull-in roller that supplies sheets one by one from the feed tray 18 to the sheet conveying path S. The registration roller 32 temporarily holds a sheet conveyed from the feed tray 18 and conveys the sheet to the transfer roller **26*a* at a timing when a leading end of the toner image on the photoreceptor drum 13 and a leading end of the sheet align with each other. The pre-registration roller 33** is a small-sized roller to facilitate the conveyance of the sheet.

The fixing device 17 is of a belt fixing type in which a fixing belt 44 is wound around a fixing roller 41 and a heating roller 43. In the fixing device 17, a pressure roller 42 is pressed against the fixing roller 41 through the fixing belt 44. The fixing device 17 receives a sheet on which an unfixed toner image is formed and conveys the sheet while nipping the sheet between the fixing belt 44 and the pressure roller 42. The sheet after fixing is discharged onto the output tray 19 by the sheet discharge roller 34.

In a case where an image is formed not only on the surface but also on the rear surface of a sheet, the sheet is conveyed in a reverse direction from the sheet discharge roller 34 to the reverse path S2, and the front and rear of the sheet is reversed. Subsequently, the sheet is guided again to the registration roller 32, an image is formed on the rear surface in the same manner as on the surface, and the sheet is conveyed onto the output tray 19.

Next, a structure of the development device 12 will be described with reference to FIG. 2 to FIG. 5.

Figure 2:
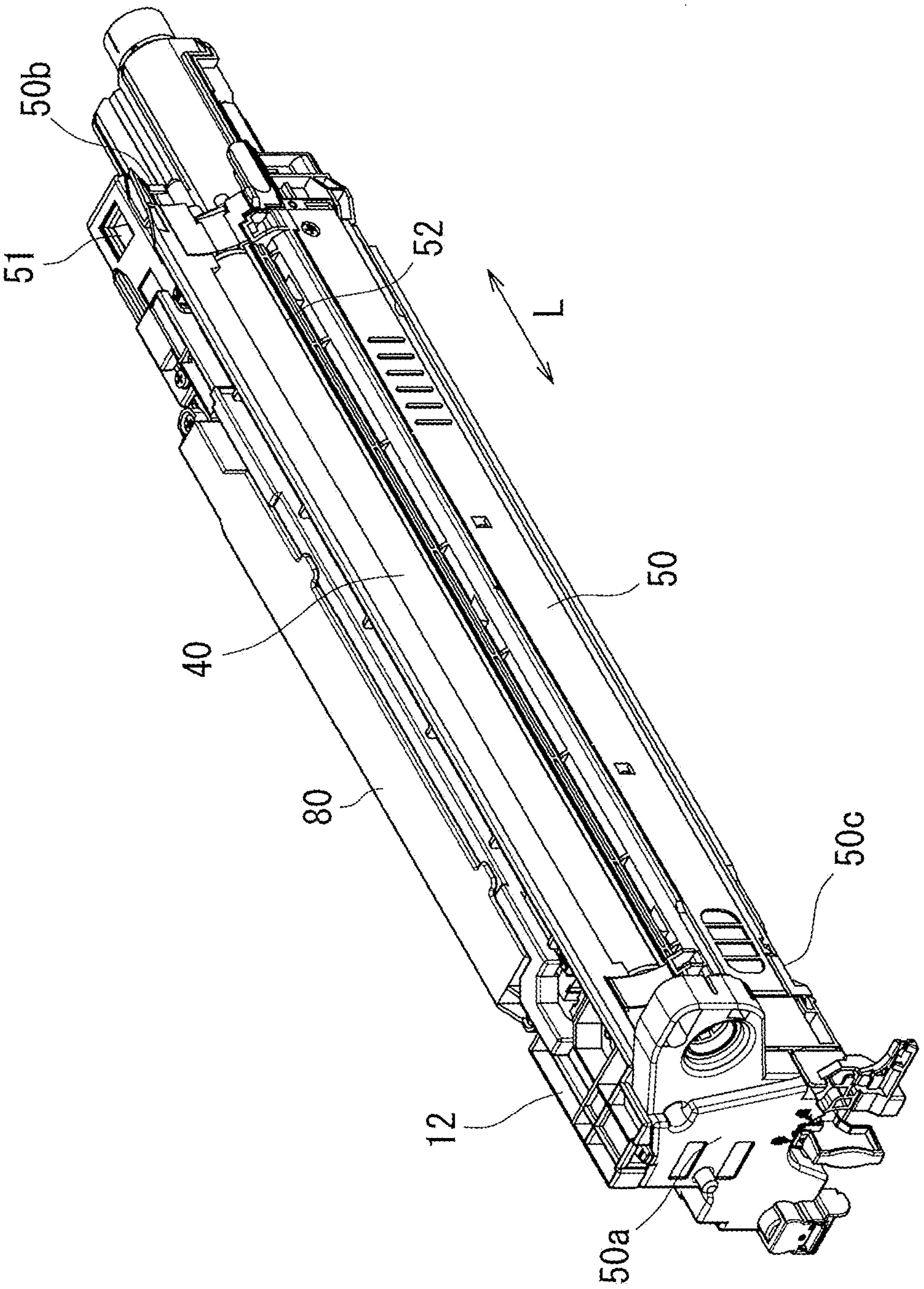
FIG. 2 is a perspective view of an external appearance of a development device.

FIG. 2 is a perspective view of an external appearance of a development device.

The development device 12 includes a development tank 50 that stores the developer including the toner, and a development roller 40 (an example of the developer carrier) that carries the developer is rotatably supported in the development tank 50. Specifically, the development tank 50 is a substantially rectangular parallelepiped container whose longitudinal direction is an axial direction L along a rotary shaft of the development roller 40 and stores the developer in a cavity provided thereinside. Hereinafter, for the sake of description, one end portion of the development tank 50 in the axial direction L may be referred to as a tank first end portion 50*a*, the other end portion thereof in the axial direction L may be referred to as a tank second end portion 50*b*, and a bottom surface thereof may be referred to as a tank bottom surface 50*c*.

In the image forming device 1, a cartridge storing the toner is detachably provided, and the toner is appropriately supplied from the cartridge to the development device 12. In the development tank 50, a supply port 51 through which the toner is supplied is provided at a position close to the tank second end portion 50*b*. Further, in the development tank 50, the development roller 40 is attached to a portion facing the photoreceptor drum 13, and a roller facing port 52 is provided by opening the vicinity of the development roller 40. The roller facing port 52 is provided at an upper portion of one side surface of the development tank 50.

A duct 80 through which air to be exhausted to the outside passes is provided at an upper surface of the development tank 50. The duct 80 is provided with an intake fan (not illustrated) that suctions air from the development tank 50. Note that in FIG. 2, a part of the duct 80 is illustrated, and the duct 80 may be connected and extended to the remaining portion (not illustrated), or an intake fan may be attached to the extended portion. In this way, attaching the intake fan to the duct 80 can cause air to be exhausted efficiently.

In the development device 12, in addition to the components described above, a member that reinforces each component, a member that supports itself so as to be attachable to the image forming device 1, a member that transmits power for rotating each component, and the like may be attached to the development tank 50.

The development roller 40 is provided so as to be in contact with the photoreceptor drum 13 when the development tank 50 is attached to the image forming device 1 and supplies the toner to the photoreceptor drum 13. In the present embodiment, the development roller 40 is disposed above the development tank 50. However, the present disclosure is not limited thereto, and the development roller 40 may be provided so as to face a portion of the development tank 50 that supplies the toner to the outside.

Figure 3:
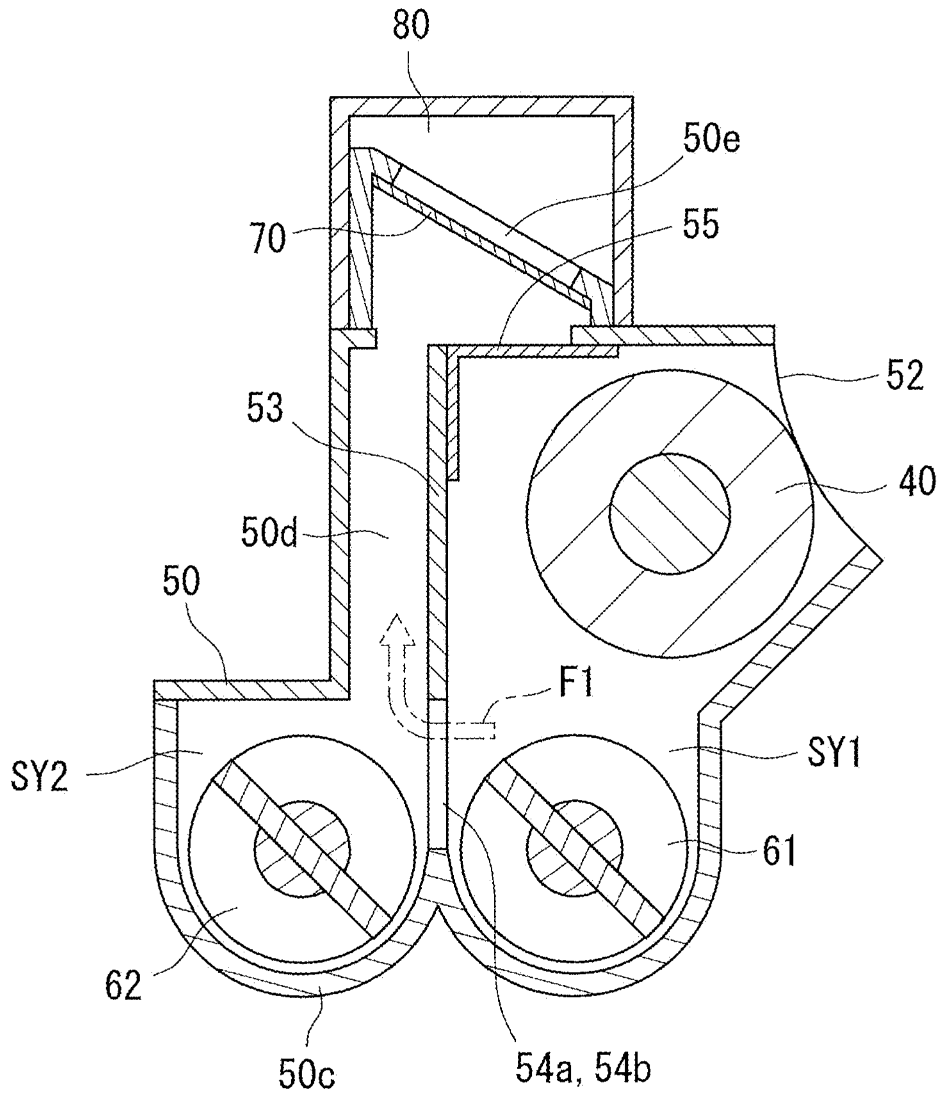
FIG. 3 is a schematic cross-sectional view illustrating a cross section of the development device viewed from an end portion side in an axial direction.
Figure 4:
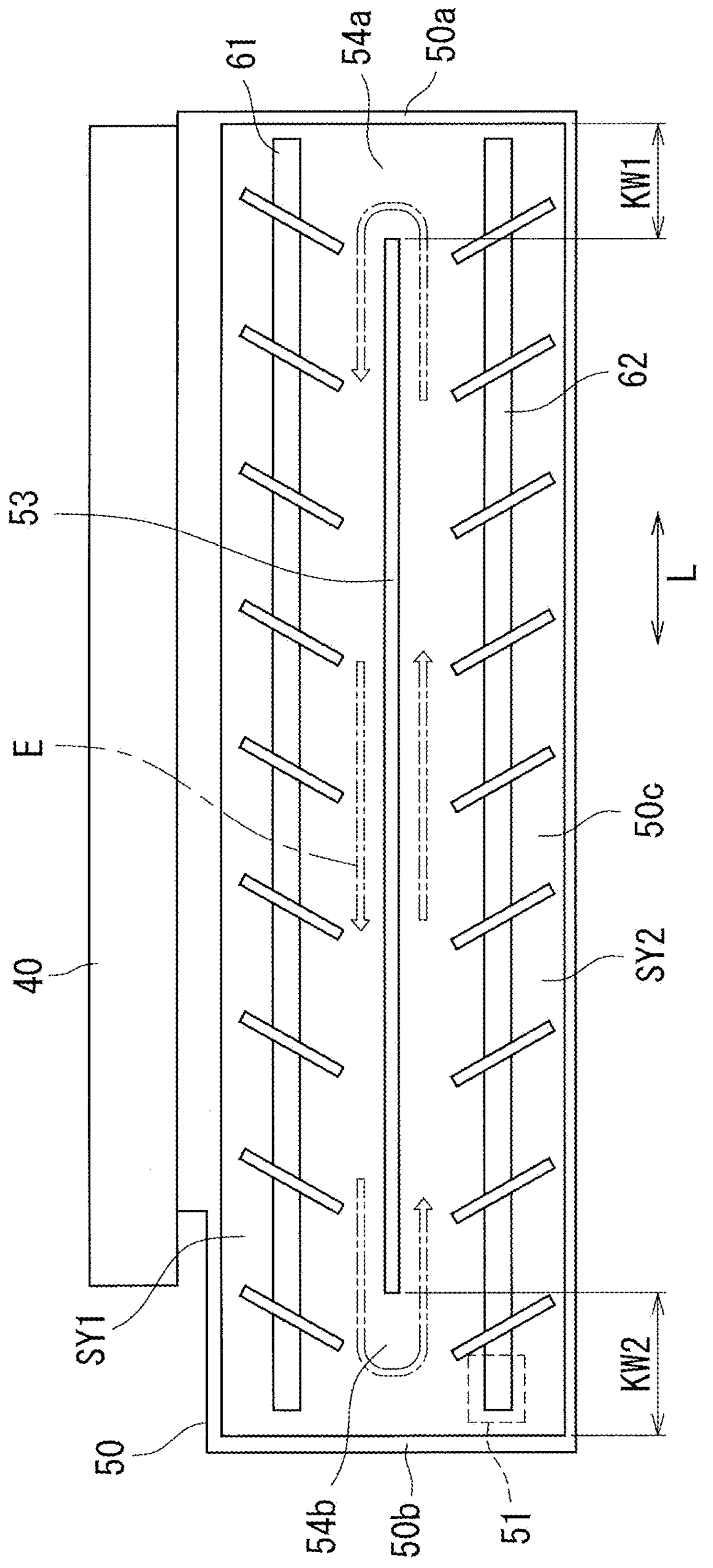
FIG. 4 is a schematic cross-sectional view illustrating a cross section of the development device viewed from above.
Figure 5:
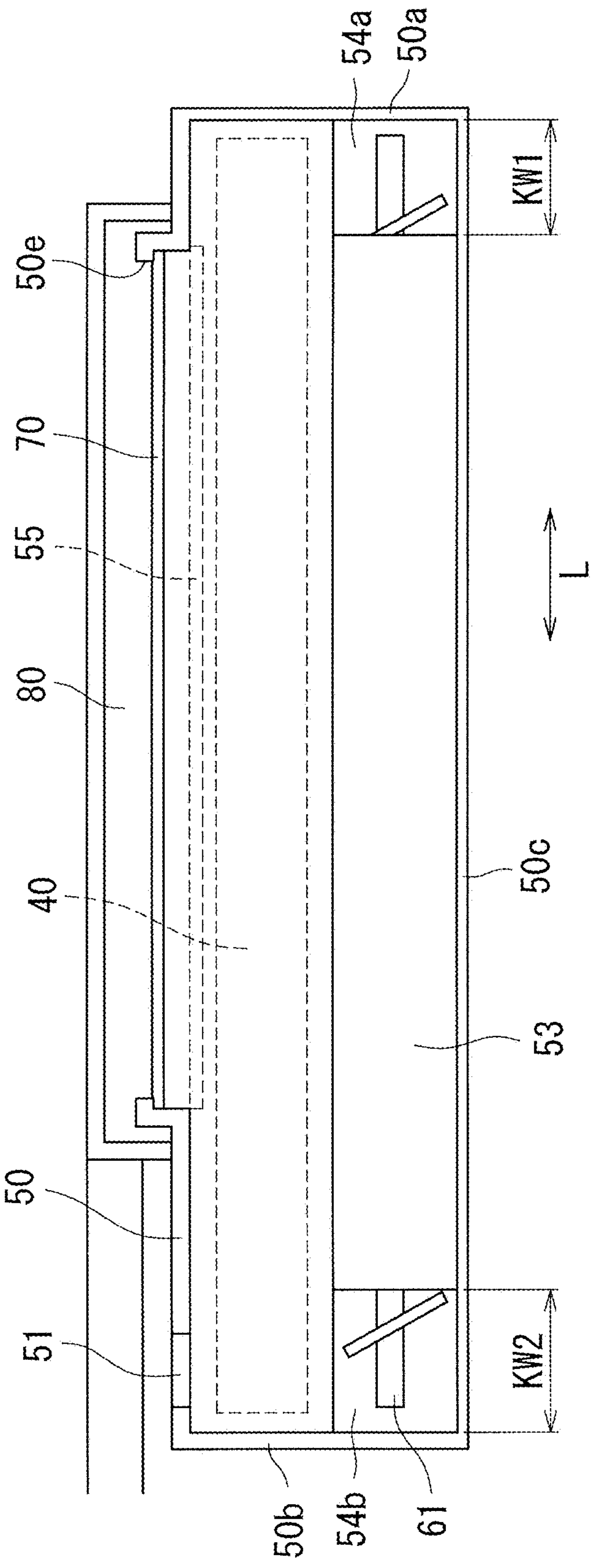
FIG. 5 is a schematic cross-sectional view illustrating a cross section of the development device viewed from a side surface side along the axial direction.

FIG. 3 is a schematic cross-sectional view illustrating a cross section of the development device viewed from the end portion side in the axial direction, FIG. 4 is a schematic cross-sectional view illustrating a cross section of the development device viewed from the top surface side, and FIG. 5 is a schematic cross-sectional view illustrating a cross section of the development device viewed from the side surface side along the axial direction.

In FIG. 3 to FIG. 5, a main portion of the development device 12 is extracted and illustrated, and one or some members are omitted in consideration of easiness of viewing the drawings. Further, in FIG. 4, the development roller 40 is displaced so as not to overlap a first screw 61 and the like.

The development tank 50 incorporates the first screw 61 (an example of the first conveyance member) and a second screw 62 (an example of the second conveyance member) each of which is provided with spiral blades at an outer periphery of a rotary shaft thereof. The first screw 61 and the second screw 62 are disposed such that the rotary shafts thereof are in parallel to each other and face each other and rotate to circulate the developer in the development tank 50. Then, the development tank 50 is provided with a first holder SY1 in which the first screw 61 is incorporated and a second holder SY2 in which the second screw 62 is incorporated, and the first holder SY1 and the second holder SY2 are partitioned by a partition wall 53.

In the partition wall 53, portions corresponding to both end portions of the first holder SY1 and the second holder SY2 in the axial direction L are opened, and flow ports (a first flow port 54*a* and a second flow port 54*b*) through which the developer flows are provided between the first holder SY1 and the second holder SY2.

As illustrated in FIG. 4, the developer is conveyed so as to circulate in the development tank 50. Then, a direction in which the developer circulates (a circulation direction E) changes as appropriate depending on a portion in the development tank 50. To be specific, the circulation direction E is a direction from the tank first end portion 50*a* (the right end in FIG. 4) toward the tank second end portion 50*b* (the left end in FIG. 4) in the first holder SY1, and the developer conveyed to the tank second end portion 50*b* is transferred to the second holder SY2 through the second flow port 54*b*. In addition, the circulation direction E in the second holder SY2 is a direction from the tank second end portion 50*b* toward the tank first end portion 50*a*, and the developer conveyed to the tank first end portion 50*a* is transferred to the first holder SY1 through the first flow port 54*a*.

As described above, the first flow port 54*a* is provided in the vicinity of the tank first end portion 50*a*, and the second flow port 54*b* is provided in the vicinity of the tank second end portion 50*b*. An opening width of the first flow port 54*a* (first opening width KW1) is larger than an opening width of the second flow port 54*b* (second opening width KW2). That is, in the conveyance direction (circulation direction E) of the developer in the development tank 50, the second flow port 54*b* facing a downstream end portion of the first screw 61 is formed to have a larger opening area than that of the first flow port 54*a*. In the development tank 50, air easily flows along the conveyance direction of the developer. By increasing a size of the second flow port 54*b*, air is easily drawn into the second holder SY2, and by decreasing a size of the first flow port 54*a*, a flow of air returning to the first holder SY1 can be suppressed.

In the development device 12, adjustment is made so that an appropriate amount of developer is stored in the development tank 50, and a height of the stored developer (a liquid surface level of the developer) preferably does not exceed the first screw 61 and the second screw 62. Heights at which the first flow port 54*a* and the second flow port 54*b* open may be adjusted as appropriate. The heights may vary from the tank bottom surface 50*c* to about a level slightly higher than upper ends of the first screw 61 and the second screw 62 and slightly higher than the liquid surface level of the developer.

In the first holder SY1, the development roller 40 is disposed above the first screw 61, and the partition wall 53 extends to a position slightly higher than the development roller 40. In the second holder SY2, an exhaust path 50*d* extending upward along the partition wall 53 is provided. The exhaust path 50*d* is formed by a housing constituting the development tank 50, and a side wall thereof extends so as to provide a gap with the partition wall 53.

An exhaust port 50*e* through which internal air is exhausted is provided at the upper portion of the development tank 50. The exhaust port 50*e* is provided with a filter 70 that collects the developer contained in the exhaust gas and is connected to the duct 80 through the filter 70.

The exhaust port 50*e* extends in the axial direction L (see, for example, FIG. 5), and is provided so as to cross over the first holder SY1 and the second holder SY2 (see, for example, FIG. 3). The second holder SY2 is connected to the exhaust port 50*e* through the exhaust path 50*d*. The shield 55 is provided between the first holder SY1 and the exhaust port 50*e*. To be more specific, the shield 55 is attached to an upper portion of the first holder SY1 so as to be connected to the partition wall 53, and blocks air so that air does not go back and forth directly between the first holder SY1 and the exhaust port 50*e*. In the present embodiment, a thin plate member formed of PET is separately provided as the shield 55 and is attached to the housing constituting the development tank 50, but the shield 55 is not limited to this, and may be a part of the housing surrounding the first holder SY1 and a portion obtained by laterally extending the partition wall 53. That is, the shield 55 may be integrated with the housing constituting the development tank 50.

In the development device 12, when the development roller 40 is rotated during image formation or the like, air is suctioned into the development tank 50 from the outside and the internal air pressure gradually increases. Thus, the air is exhausted through the exhaust port 50*e*, reducing the air pressure. At this time, since the first holder SY1 is blocked at the exhaust port 50*e* side by the shield 55, the air flows into the second holder SY2 through the flow port as indicated by an arrow F1. The air that has entered the second holder SY2 passes through the exhaust path 50*d* and is exhausted from the exhaust port 50*e*. In addition, when the exhaust gas passes through the exhaust port 50*e*, the developer contained in the exhaust gas is collected by the filter 70.

As described above, by blocking the air flowing from the first holder SY1 to the exhaust port 50*e* by the shield 55 and guiding the air to flow through the exhaust port 50*e* through the second holder SY2, the air flow toward the development roller 40 can be eliminated. This can suppress the spouting of the toner from the vicinity of the development roller 40. In addition, since the shield 55 is provided so as to block a wide space including the periphery of the development roller 40, the air flow toward the development roller 40 can be more reliably eliminated.

According to the configuration of the present disclosure, providing the exhaust port 50*e* at the upper portion of the development tank 50 makes it possible to suction only the exhausted air while reducing the influence on the stored developer. In addition, a large amount of air can be exhausted by increasing an area of the exhaust port 50*e* as much as possible.

The image forming device 1 includes a controller (for example, a CPU or the like) that controls various operations. The image forming device 1 operates the intake fan in accordance with an instruction from the controller and performs an operation of discharging air from the development tank 50. A timing at which the intake fan is operated is, for example, after image formation, and by discharging the toner that has been scattered during the image formation, the scatter of the toner during the next image formation can be reduced.

In addition, the controller may have both functions of a printing rate determinator that determines a printing rate on a sheet on which an image is formed and a sheet number counter that counts the number of sheets on each of which an image is formed, and may operate the intake fan based on the printing rate and the number of sheets in the image formation. With respect to the printing rate and the number of sheets, a threshold value, a table in which both are associated with each other, and the like may be set, and a toner consumption amount (and a toner replenishment amount) may be estimated with reference to the threshold value, the table, and the like. In the image forming device 1, as an image having a high printing rate is formed, the toner consumption amount increases, and more toner may be scattered from the development device 12. Thus, in consideration of the printing rate and the number of sheets in the image formation, the toner is exhausted at the timing when the toner consumption amount exceeds the reference value, so that the scatter of the toner can be reduced.

Second Embodiment

Next, an image forming device according to a second embodiment of the present disclosure will be described with reference to the accompanying drawings.

The second embodiment differs from the first embodiment in terms of the configuration of the partition wall 53. Note that the second embodiment has a configuration substantially similar to that of the first embodiment illustrated in FIG. 1 to FIG. 5, description thereof will be omitted and only different points will be described.

Figure 6:
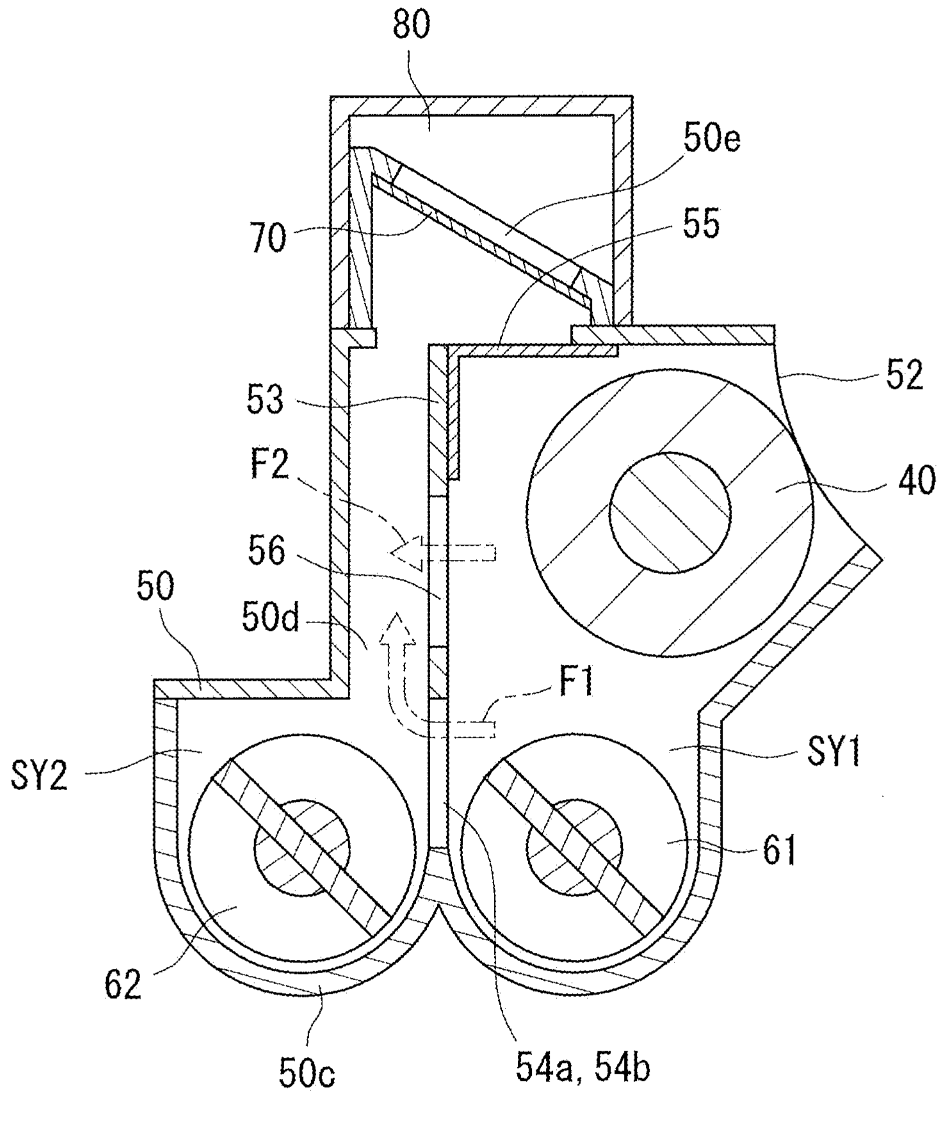
FIG. 6 is a schematic cross-sectional view illustrating a cross section of a development device, according to a second embodiment of the present disclosure, viewed from an end portion side in an axial direction.
Figure 7:
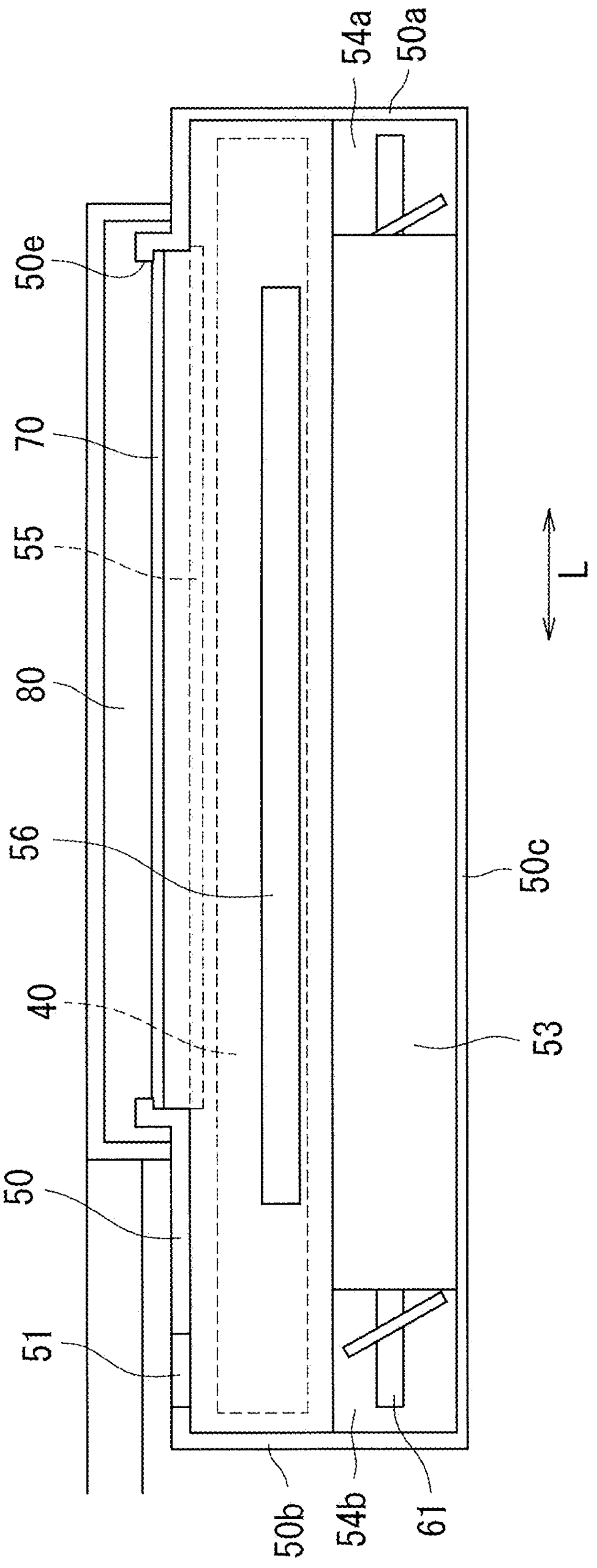
FIG. 7 is a schematic cross-sectional view illustrating a cross section of the development device, according to the second embodiment of the present disclosure, viewed from the side surface side along the axial direction.

FIG. 6 is a schematic cross-sectional view illustrating a cross section of the development device, according to the second embodiment of the present disclosure, viewed from an end portion side in the axial direction, and FIG. 7 is a schematic cross-sectional view illustrating a cross section of the development device, according to the second embodiment of the present disclosure, viewed from a side surface side along the axial direction.

The second embodiment is different from the first embodiment in that a ventilation port 56 is provided at the partition wall 53. Specifically, the ventilation port 56 is formed by opening a portion of the partition wall 53 that faces the development roller 40 in the horizontal direction. That is, the ventilation port 56 is provided at the same height as the development roller 40 and at a position higher than the liquid surface level of the developer. Thus, the ventilation port 56 does not allow the developer being conveyed by the first screw 61 and the second screw 62 to pass therethrough but allows the air to pass therethrough from the first holder SY1 to the second holder SY2 (the exhaust path 50*d*) as indicated by the arrow F2. In this way, by providing the ventilation port 56 and actively drawing the air around the development roller 40 into the second holder SY2, the scatter of the toner can be reduced.

Note that the embodiments disclosed herein are illustrative in all respects and are not the basis for a limited interpretation. Accordingly, the technical scope of the disclosure is not to be construed by the foregoing embodiments only and is defined based on the description of the claims. In addition, meanings equivalent to the range of the claims and all changes made within the range are included.

The invention claimed is:

1. A development device comprising:

a development tank that stores a developer, the developer including a toner;

a developer carrier that carries the developer;

a first conveyance member and a second conveyance member that have rotary shafts being in parallel with each other and facing each other, that stir and convey the developer in the development tank, and that supply the developer to the developer carrier;

an exhaust port through which air inside the development tank is exhausted; and a filter that is provided at the exhaust port and that collects the developer included in the exhausted air, wherein:

the development tank is provided with:

a first holder provided with the first conveyance member and disposed at a near side to the developer carrier, a second holder provided with the second conveyance member and disposed at a far side from the developer carrier, a partition wall that partitions the first holder and the second holder, and a first flow port and a second flow port that are provided, respectively, at both end portions in an axial direction along the rotary shafts of the first conveyance member and the second conveyance member, and that open the partition wall, the developer flowing from the second holder to the first holder through the first flow port, the developer flowing from the first holder to the second holder through the second flow port, a shield partitions the first holder and the exhaust port, the second holder is connected to the exhaust port, and is provided with an exhaust path above the second conveyance member, the exhaust path extending upward along the partition wall, the exhaust path is a gap having a width smaller than a width of the second conveyance member, and has a common space located, at a position higher than the shield, above both the first holder and the second holder, the exhaust port is located across and above the first holder and the second holder via the common space, and the filter is disposed in an inclined manner as a side of the second holder is higher than a side of the first holder.

2. The development device according to claim 1, wherein the second flow port has an opening area larger than an opening area of the first flow port.

3. The development device according to claim 1, wherein the developer carrier is provided above the first conveyance member, and the partition wall is provided with a ventilation port that opens at a portion facing the developer carrier in a horizontal direction.

4. The development device according to claim 1, wherein the developer carrier is provided above the first conveyance member, and the shield is provided above the developer carrier.

5. The development device according to claim 1, wherein the exhaust port is provided at an upper portion of the development tank and extends in the axial direction.

6. An image forming device comprising:

the development device according to claim 1, wherein the exhaust port is connected to a duct through which air passes via the filter, and the duct is provided with an intake fan that suctions air from the development tank.

7. The image forming device according to claim 6, wherein the intake fan suctions air from the development tank after image formation.

8. The image forming device according to claim 6, further comprising:

a printing rate determinator that determines a printing rate which is a rate of an image printed on a sheet; and a sheet number counter that counts a number of sheets on each of which the image is formed, wherein the intake fan suctions air from the development tank at a time that a toner consumption amount exceeds a reference value based on the printing rate and the number of sheets in image formation.

* * * * *